(12) United States Patent
Saito (10) Patent No.: US 11,269,192 B2
(45) Date of Patent: Mar. 8, 2022

(54) OPTICAL ELEMENT, HAVING HOLOGRAPHIC MATERIAL LAYER, DISPLAY DEVICE, AND METHOD FOR MANUFACTURING OPTICAL ELEMENT

(71) Applicant: SEIKO EPSON CORPORATION, Tokyo (JP)

(72) Inventor: Atsushi Saito, Chino (JP)

(73) Assignee: SEIKO EPSON CORPORATION, Tokyo (JP)

(*) Notice: Subject to any disclaimer, the term of this patent is extended or adjusted under 35 U.S.C. 154(b) by 34 days.

(21) Appl. No.: 16/825,236

(22) Filed: Mar. 20, 2020

(65) Prior Publication Data
US 2020/0301157 A1    Sep. 24, 2020

(30) Foreign Application Priority Data
Mar. 22, 2019    (JP) .............................. JP2019-054812

(51) Int. Cl.
*G02B 27/42* (2006.01)
*G03H 1/04* (2006.01)
*G03H 1/22* (2006.01)

(52) U.S. Cl.
CPC ....... *G02B 27/4205* (2013.01); *G03H 1/0402* (2013.01); *G03H 1/2205* (2013.01); *G03H 1/2286* (2013.01); *G03H 2001/0415* (2013.01); *G03H 2001/0439* (2013.01); *G03H 2001/2231* (2013.01); *G03H 2222/12* (2013.01); *G03H 2222/13* (2013.01); *G03H 2222/31* (2013.01); *G03H 2222/34* (2013.01); *G03H 2222/42* (2013.01); *G03H 2222/43* (2013.01)

(58) Field of Classification Search
None
See application file for complete search history.

(56) References Cited

U.S. PATENT DOCUMENTS

| 2015/0260994 | A1  | 9/2015  | Akutsu et al. |
| 2018/0095212 | A1* | 4/2018  | Bablumyan .......... G03H 1/0248 |
| 2020/0386947 | A1* | 12/2020 | Waldern ............. G02B 27/0172 |

FOREIGN PATENT DOCUMENTS

JP    2015-175967 A    10/2015

* cited by examiner

*Primary Examiner* — Jennifer D. Carruth
(74) *Attorney, Agent, or Firm* — Oliff PLC (57) ABSTRACT

A deflection optical element, which diffracts incident light, includes a substrate having translucency, and a holographic material layer disposed so as to overlap the substrate, the holographic material layer being formed with a diffraction grating composed of interference fringes, wherein the holographic material layer is formed with an alignment mark where the interference fringes are discontinuous, and the alignment mark is located in an optically effective area where the holographic material layer diffracts the incident light.

5 Claims, 10 Drawing Sheets

OPTICAL ELEMENT, HAVING HOLOGRAPHIC MATERIAL LAYER, DISPLAY DEVICE, AND METHOD FOR MANUFACTURING OPTICAL ELEMENT

The present application is based on, and claims priority from JP Application Serial Number 2019-054812, filed Mar. 22, 2019, the disclosure of which is hereby incorporated by reference herein in its entirety.

BACKGROUND

1. Technical Field

The present disclosure relates to an optical element, a display device, and a method for manufacturing the optical element.

2. Related Art

In the related art, a technology for performing alignment of a plurality of optical elements is known.

For example, an optical device of JP 2015-175967 A is produced with an alignment mark being subjected to an interference exposure outside of the interference fringe formation region of the first hologram diffraction grating and the second hologram diffraction grating. These alignment marks are then optically detected to make the first hologram diffraction grating and the second hologram diffraction grating relatively aligned with each other.

Unfortunately, when the alignment mark is provided outside of the interference fringe formation region as in JP 2015-175967 A, a holographic material is required which is larger than the optically effective area used for diffraction of light, and the size of the exposure device for exposing the holographic material increases.

SUMMARY

An aspect for resolving the above-described issue is an optical element diffracting incident light, the optical element including a substrate having translucency, and a holographic material layer disposed so as to overlap the substrate, the holographic material layer being formed with a diffraction grating composed of interference fringes, wherein the holographic material layer is formed with a marking area where the interference fringes are discontinuous, and the marking area is located in an optically effective area where the holographic material layer diffracts the incident light.

In the above-described optical element, the marking area may be formed with interference fringes that are discontinuous with the interference fringes outside the marking area.

In the above-described optical element, the marking area may be formed with no interference fringes.

The above-described optical element may have a surface layer having translucency, in which the holographic material layer may be disposed between the substrate and the surface layer.

In the above-described optical element, in the holographic material layer, the optically effective area may be provided with a plurality of the marking areas.

Another aspect for resolving the above-described issue is a display device including an image-light generating unit configured to generate image light, and a light-guiding optical system configured to guide the image light emitted from the image-light generating unit, in which the light-guiding optical system includes the optical element according to any one of the aspect described above.

Another aspect for resolving the above-described issue is a method for manufacturing an optical element, by exposing an exposed member to form a diffraction grating composed of an interference fringes, the method including disposing a marking member that makes the interference fringes discontinuous in at least one of an optical path of a reference light with which the exposed member is irradiated and an optical path of an object light with which the exposed member is irradiated, and forming, in the exposed member, a marking area where the interference fringes are discontinuous.

DESCRIPTION OF EXEMPLARY EMBODIMENTS

First Embodiment

Figure 1:
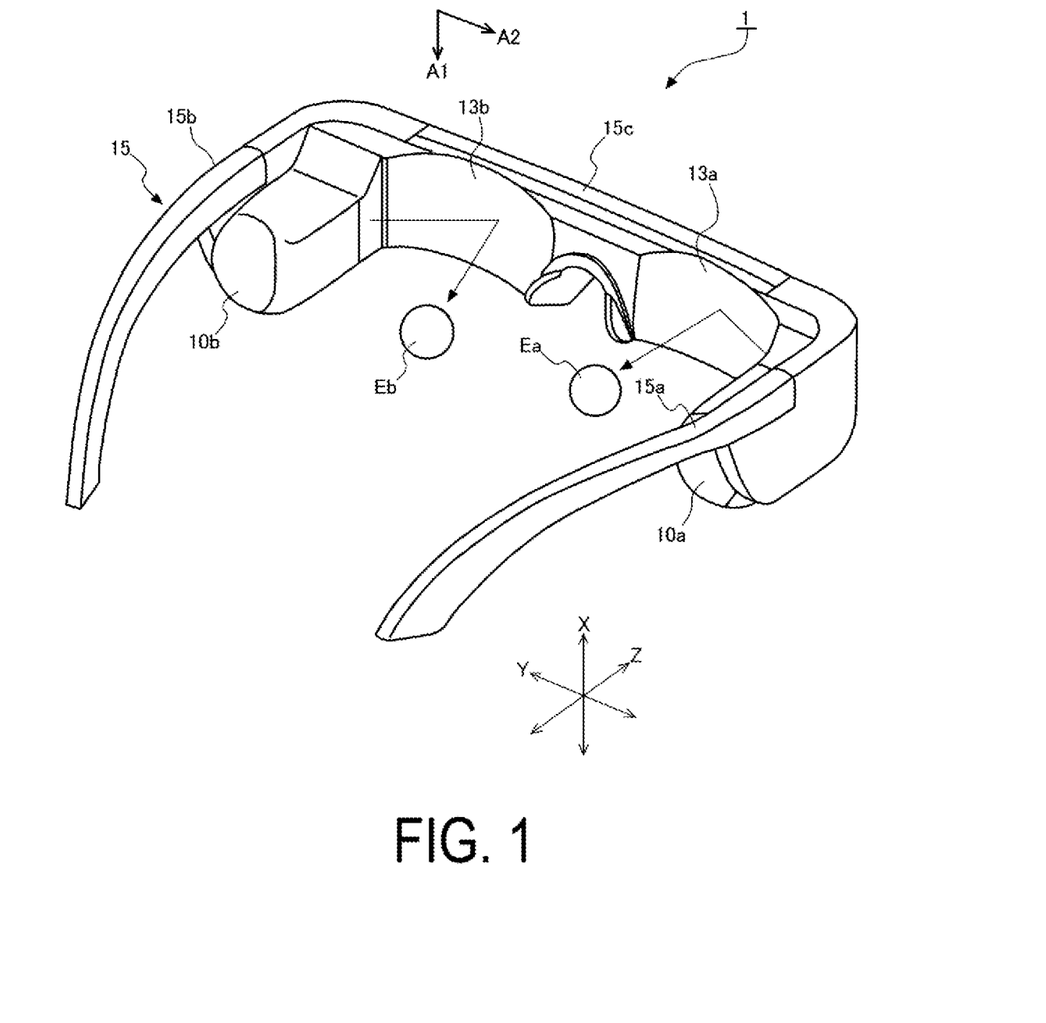
FIG. 1 is an external perspective view illustrating an external appearance of a display device.

FIG. 1 is an external perspective view illustrating an external appearance of a display device 1 to which the present disclosure is applied.

The display device 1 is a head-mounted display device. The display device 1 includes an image-light generating unit 10a for right eye having laser light as a light source, and a light-guiding optical system 17a for right eye configured to allow image light emitted from the image-light generating unit 10a for right eye to be guided to enter a right eye Ea of the user. The image-light generating unit 10a and an image-light generating unit 10b correspond to the "image-light generating unit". FIG. 1 illustrates a deflection optical element 13a included in the light-guiding optical system 17a. The display device 1 also includes the image-light generating unit 10b for left eye having laser light as a light source, and a light-guiding optical system 17b for left eye configured to allow image light emitted from the image-light generating unit 10b for left eye to be deflected to enter a left eye Eb of the user. FIG. 1 illustrates a deflection optical element 13b included in the light-guiding optical system 17b. Hereinafter, when the deflection optical element 13a and the deflection optical element 13b are collectively referred, these are described as "deflection optical element 13". The deflection optical element 13 corresponds to an example of the "optical element" of the present disclosure.

The display device 1, which is a head-mounted body having an eyeglass shape worn by the user on the head, includes a frame 15. The frame 15 includes a temple 15a on the right side, a temple 15b on the left side, and a front portion 15c. The image-light generating unit 10a is provided on the temple 15a on the right side, and the image-light generating unit 10b is provided on the temple 15b on the left side. Further, the front portion 15c of the frame 15 supports the deflection optical element 13a and the deflection optical element 13b.

Figure 2:
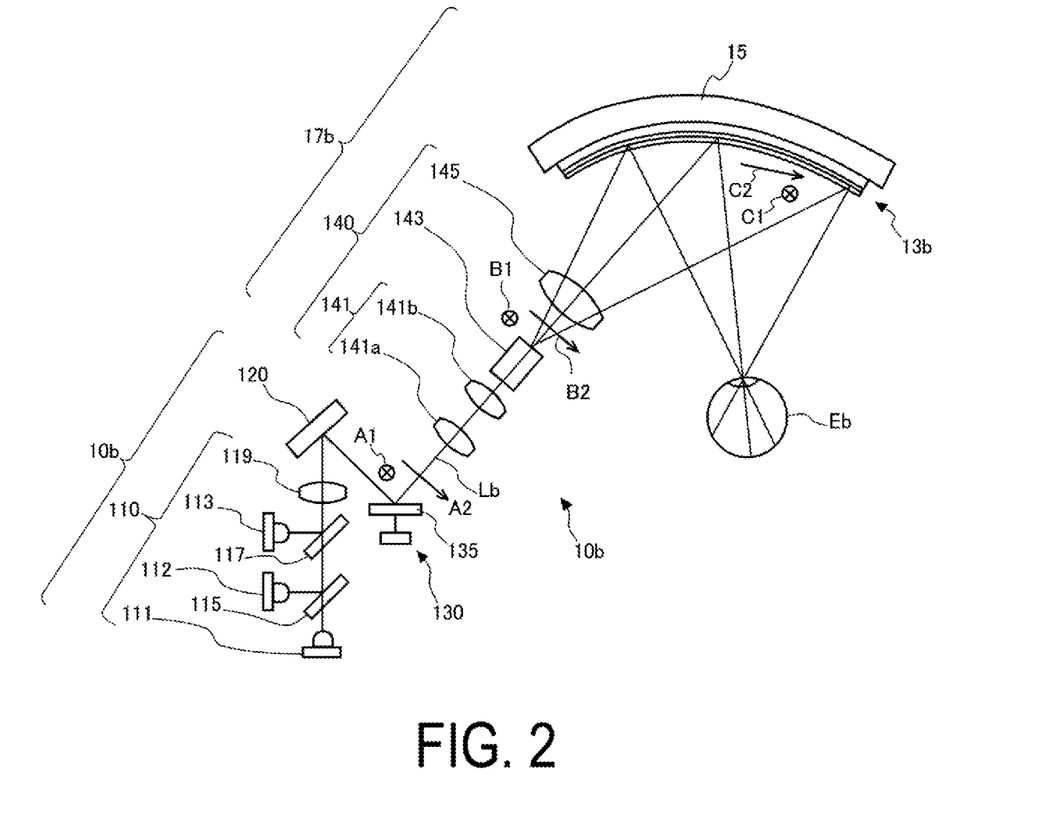
FIG. 2 is an external perspective view illustrating an image-light generating unit and a light-guiding optical system.

FIG. 2 is a perspective view illustrating an external appearance of the image-light generating unit 10b and the light-guiding optical system 17b. The image-light generating unit 10a and the light-guiding optical system 17a have the same configuration as the image-light generating unit 10b and the light-guiding optical system 17b. Accordingly, the image-light generating unit 10b and the light-guiding optical system 17b will be described in the following description, and the description of the image-light generating unit 10a and the light-guiding optical system 17a will be omitted.

The image-light generating unit 10b includes a light source unit 110, a diffraction element 120, and a scanning optical system 130. The light-guiding optical system 17b includes an optical system 140 and the deflection optical element 13b.

The light source unit 110 emits light source light to be modulated or modulated light having been modulated. In the first embodiment, a case where the light source unit 110 emits modulated light having been modulated will be described. The light source unit 110 includes three laser elements of a red laser element 111 configured to emit red light, a green laser element 112 configured to emit green light, and a blue laser element 113 configured to emit blue light. The red laser element 111, the green laser element 112, and the blue laser element 113 are semiconductor lasers, and a non-illustrated controller controls the elements to irradiate a luminous flux modulated to the light intensity corresponding to each of the dots of the image to be displayed.

The light source unit 110 also includes two half mirrors 115 and 117 configured to synthesize the optical paths of the laser light emitted from the red laser element 111, the green laser element 112, and the blue laser element 113, and a collimating lens 119. The red light, green light, and blue light emitted from the collimating lens 119 are each incident on the diffraction element 120.

The diffraction element 120 diffracts the incident colored light in a predetermined direction. The colored light diffracted by the diffraction element 120 is incident on the scanning optical system 130. The scanning optical system 130, which includes a scanning mirror 135, and causes the scanning mirror 135 to scan the luminous flux of the incident colored light to generate image light Lb. The scanning optical system 130 scans the incident colored light in the first scanning direction A1 and in the second scanning direction A2 intersecting the first scanning direction A2 to generate the image light Lb. The scanning optical system 130 is achieved by a micromirror device formed by Micro Electro Mechanical Systems (MEMS) technology using, for example, a silicon substrate or the like.

In the optical system 140, a relay lens system 141 provided with lenses 141a and 141b and the like, a luminous flux diameter-expanding element 143, a projection lens system 145, and the deflection optical element 13b are arranged in this order from the scanning optical system 130 toward the deflection optical element 13b. The luminous flux diameter-expanding element 143 expands the luminous flux emitted from the scanning optical system 130 to at least one of the first expansion direction B1 corresponding to the first scanning direction A1 or the second expansion direction B2 corresponding to the second scanning direction A2.

The projection lens system 145 projects the image light Lb expanded by the luminous flux diameter-expanding element 143 onto the deflection optical element 13b. The deflection optical element 13b deflects the image light Lb incident, in a first incident direction C1 corresponding to the first scanning direction A1 and a second incident direction C2 corresponding to the second scanning direction A2. The image light Lb deflected by the deflection optical element 13b reaches the retina through the pupil of the left eye Eb to make the user recognize an image.

Figure 3:
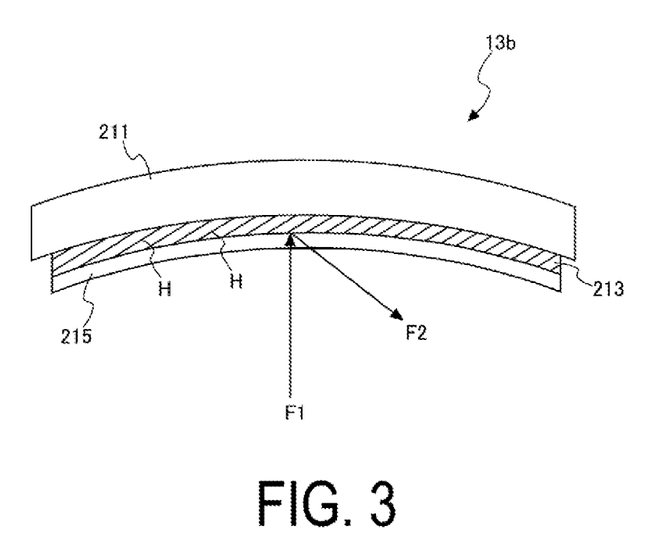
FIG. 3 is a view illustrating a configuration of a deflection optical element.

FIG. 3 is a cross-sectional view illustrating a configuration of the deflection optical element 13b.

The deflection optical element 13b is a layered body including a substrate 211, a holographic material layer 213, and a transparent film layer 215. The substrate 211 is a plastic substrate having translucency composed of PET, acrylic resin, or the like, for example. The holographic material layer 213 is a layer of a volume holographic element composed of a photopolymer material having a thickness of approximately from 5 to 50 µm. The transparent film layer 215, which is a protective layer for protecting the holographic material layer 213, has translucency. The transparent film layer 215 is constituted by a transparent film of polyethylene terephthalate (PET), polycarbonate (PC), polyamide (PA), triacetyl cellulose (TAC), or the like, for example.

The holographic material layer 213 is formed with an interference fringes thereinside and functions as a diffraction grating. The holographic material layer 213 selectively diffracts, with the interference fringes, light of a specific wavelength depending on the incident angle, and transmits light of the remaining wavelength. Accordingly, the external light incident on the deflection optical element 13b is also incident on the left eye Eb via the deflection optical element 13b. The user can recognize an image that the image light Lb formed by the display device 1 and the external light are superimposed on each other. In addition, the deflection optical element 13b, which forms a concave curved surface concaved to the opposite side of the left eye Eb of the user, can efficiently cause the image light Lb to converge toward the left eye Eb of the user.

The image light Lb of red light, green light, and blue light is incident on the holographic material layer 213, and the holographic material layer 213 diffracts the image light Lb incident, in a predetermined direction to be emitted. The holographic material layer 213 may be configured such that interference fringes having a pitch corresponding to the wavelength of red light, interference fringes having a pitch corresponding to the wavelength of green light, and interference fringes having a pitch corresponding to the wavelength of blue light are layered in the thickness direction of the diffraction element.

The holographic material layer 213 also disperses photosensitive material having sensitivity corresponding to the respective wavelengths of red light, green light, and blue light in the holographic material layer 213, and performs interference exposure on the holographic material layer 213 using reference light SB and object light OB of the respective wavelengths. Thereby, interference fringes may be formed in one piece of the holographic material layer 213.

The interference fringes are a fringe pattern formed by separating coherent light emitted from a common light source into the object light OB and the reference light SB, and irradiating the object light OB and the reference light SB that are separated to the holographic material layer 213 to perform interference exposure. The interference fringes are recorded in the holographic material layer 213 as a change in refractive index, a change in transmittance, and a change in shape of uneven pattern and the like.

FIG. 3 illustrates a state where interference fringes H are inclined in one direction with respect to the incident surface of the diffraction grating formed in the holographic material layer 213. An incidence of a light ray F1 of a single wavelength from the normal direction of the holographic material layer 213 into the diffraction grating where the interference fringes H illustrated in FIG. 3 is formed causes diffraction light F2 having the highest diffraction efficiency to be emitted in one direction.

Figure 4:
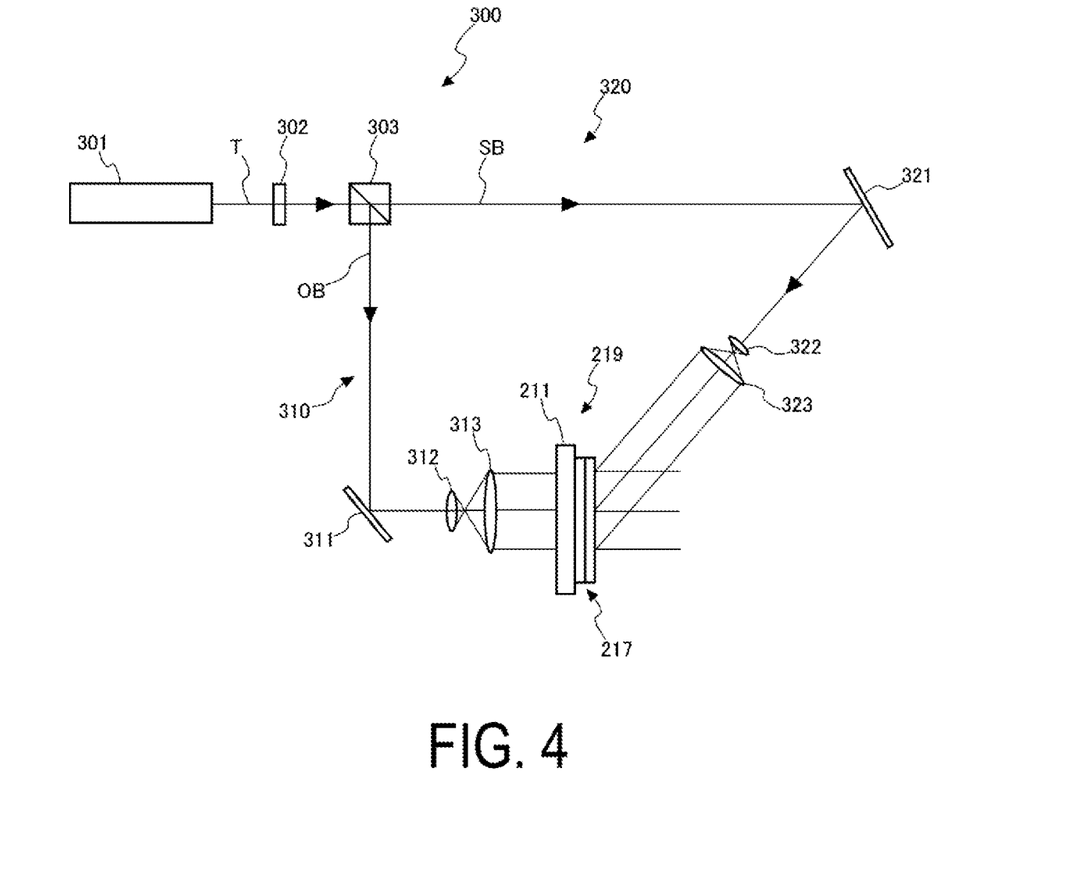
FIG. 4 is a view schematically illustrating a configuration of an exposure device.
Figure 5:
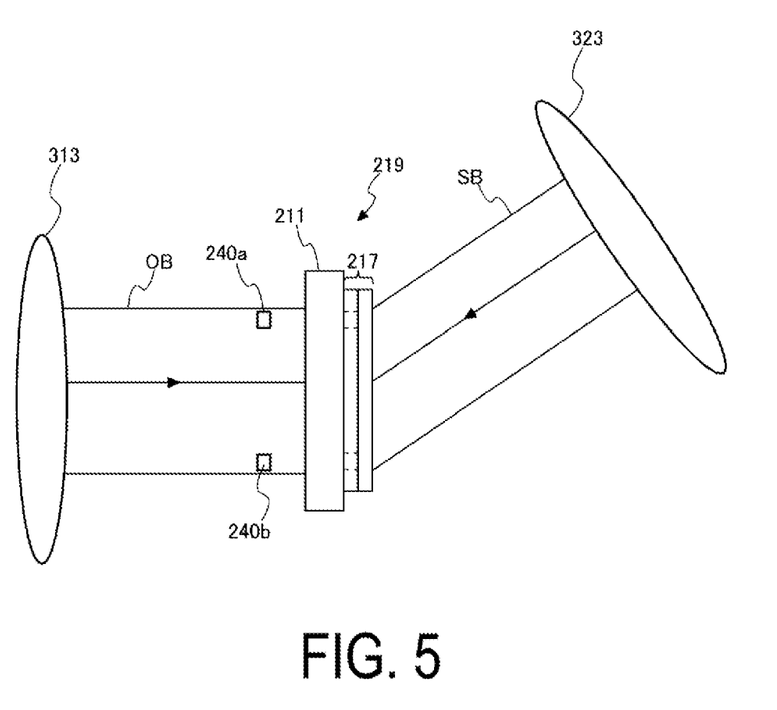
FIG. 5 is an enlarged view of a main portion of an exposure device and a holographic material layer.
Figure 6:
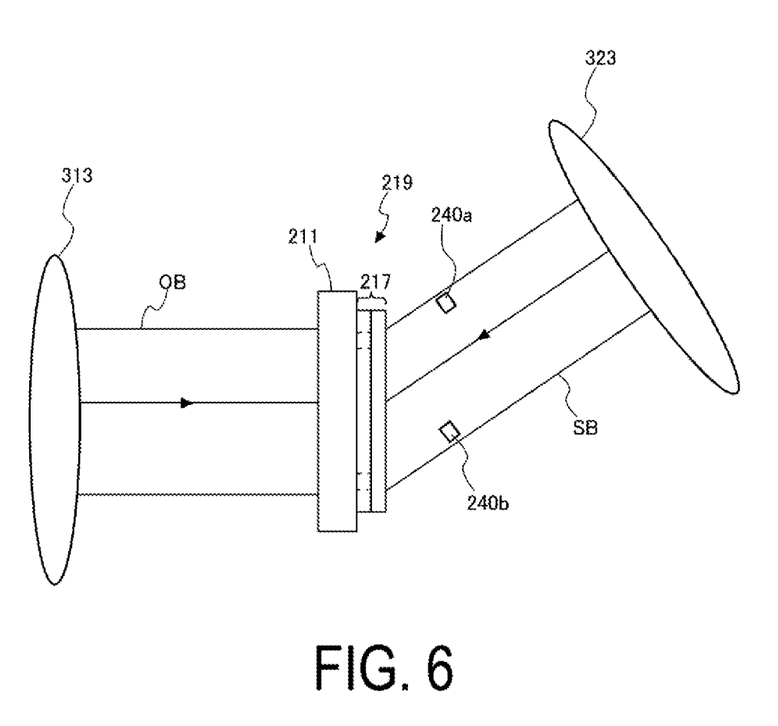
FIG. 6 is an enlarged view of a main portion of an exposure device and a holographic material layer.

FIG. 4 is a view schematically illustrating the configuration of an exposure device 300. Further, FIGS. 5 and 6 are partially enlarged views enlarging portions of the exposure device 300 and an exposed member 219 including the holographic material layer 213.

First, the exposed member 219 exposed by the exposure device 300 will be described below.

The exposed member 219 is a member to which a holographic material film 217 is attached to the substrate 211. The holographic material film 217 includes the holographic material layer 213 where interference fringes are not yet formed, and the transparent film layer 215.

The exposure device 300 includes a laser light source 301 configured to emit laser light T to serve as exposure light, a shutter 302 configured to switch passing and blocking of the laser light T, and a beam splitter 303 configured to separate the laser light T into the object light OB and the reference light SB. A polarizing beam splitter may also be used in place of the beam splitter 303. When using a polarizing beam splitter, the intensity ratio of the reference light SB can be adjusted in combination with a half-wavelength plate.

The exposure device 300 also includes a first exposure optical system 310 configured to irradiate the object light OB from one surface side of the exposed member 219, and a second exposure optical system 320 configured to irradiate the reference light SB from the other surface side of the exposed member 219.

The first exposure optical system 310 includes a first mirror 311 that curves the optical path of the object light OB, a first objective lens 312 that converges the object light OB, and a first collimator lens 313 that renders the object light OB having been converged, into a parallel luminous flux. The first exposure optical system 310 irradiates the object light OB substantially perpendicular with respect to one surface of the exposed member 219.

The second exposure optical system 320 includes a second mirror 321 that curves the optical path of the reference light SB, a second objective lens 322 that converges the reference light SB, and a second collimator lens 323 that renders the reference light SB having been converged, into a parallel luminous flux. The second exposure optical system 320 irradiates the reference light SB in an oblique direction with respect to the other surface of the exposed member 219.

The exposure device 300 having the above-described configuration causes the object light OB and the reference light SB to be simultaneously irradiated from different directions to the exposed member 219. At this time, interference fringes are formed in the holographic material layer 213 by exposure light formed by interference of the object light OB with the reference light SB.

Further, as illustrated in FIG. 5, marking members 240a and 240b are disposed in the optical path of the object light OB emitted from the first collimator lens 313. The marking members 240a and 240b are disposed in the optical path of the object light OB and at positions corresponding to the positions at which alignment marks 230a and 230b of the exposed member 219 are to be formed. The alignment marks 230a and 230b are used as marks for alignment performed when attaching the deflection optical element 13b to the frame 15. The marking members 240a and 240b are composed of a glass or a transparent plastic such as acrylic, for example. The marking members 240a and 240b may also be composed of a transparent liquid, or a dielectric film or a dielectric multilayer film that changes phase.

The marking members 240a and 240b have a function of making the wave front of the object light OB discontinuous by means of a difference in refractive index with the air. In the object light OB emitted from the first collimator lens 313, the object light OB passing through the marking members 240a and 240b differs in phase from the object light OB not passing through the marking members 240a and 240b, and forms a discontinuous phase.

The area of the holographic material layer 213 irradiated with the object light OB passing through the marking members 240a and 240b is referred to as marking area. The area of the holographic material layer 213 irradiated with the object light OB not passing through the marking members 240a and 240b is referred to as non-marking area. The interference fringes formed in the marking area differ in phase from the interference fringes formed in the non-marking area. That is, the interference fringes formed in the marking area are discontinuous interference fringes. Accordingly, the interference fringes formed in the marking area can be distinguished from the interference fringes formed in the non-marking area, and the interference fringes formed in the marking area can be used as the alignment marks 230a and 230b for alignment.

Further, as illustrated in FIG. 6, the marking members 240a and 240b may be disposed in the optical path of the reference light SB. The marking members 240a and 240b are disposed in the optical path of the reference light SB and at positions corresponding to the positions at which the alignment marks 230a and 230b of the exposed member 219 are to be formed.

Figure 7:
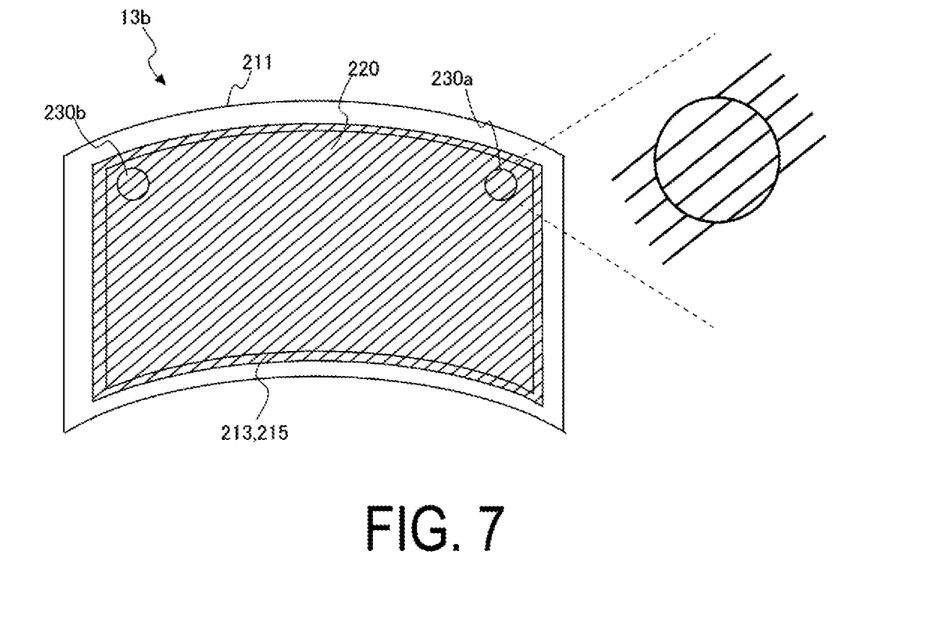
FIG. 7 is a view of a deflection optical element viewed from a side of a transparent film layer.

FIG. 7 is a front view of the deflection optical element 13b as viewed from the side of the transparent film layer 215.

The alignment marks 230a and 230b are formed within an optically effective area 220 that causes the image light Lb incident on the holographic material layer 213 to be diffracted. Two marks of the alignment marks 230a and 230b are formed within the optically effective area 220. Further, in the alignment marks 230a and 230b, interference fringes discontinuous in phase with the interference fringes formed in other regions of the optically effective area 220 are formed.

The optically effective area 220 is an area where interference fringes are formed, or an area inside of the outer edge of the area where the interference fringes are formed. In addition, the phrase that the alignment marks 230a and 230b, that is, the marking area is located within the optically effective area 220 encompasses that an area that does not diffract image light in a desired direction is included within the optically effective area 220.

Figure 8:
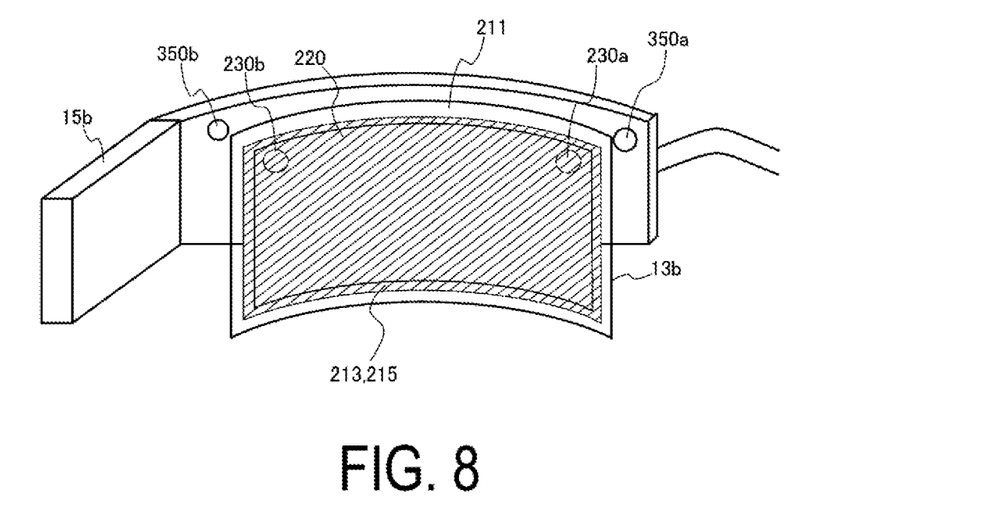
FIG. 8 is an explanatory view illustrating a method for attaching a deflection optical element to a frame.

FIG. 8 is an explanatory view illustrating a method for attaching the deflection optical element 13b to the frame 15.

There are formed alignment marks 350a and 350b in the frame 15. The alignment mark 350a is formed on the side of the nose pads of the frame 15, and the alignment mark 350b is formed on the side of the temple 15b of the frame 15. The positions of the alignment marks 230a and 230b of the deflection optical element 13b are adjusted to be aligned with the positions of the alignment marks 350a and 350b with reference to the positions of the alignment marks 350a and 350b of the frame 15. The deflection optical element 13b is then attached to the frame 15.

Figure 9:
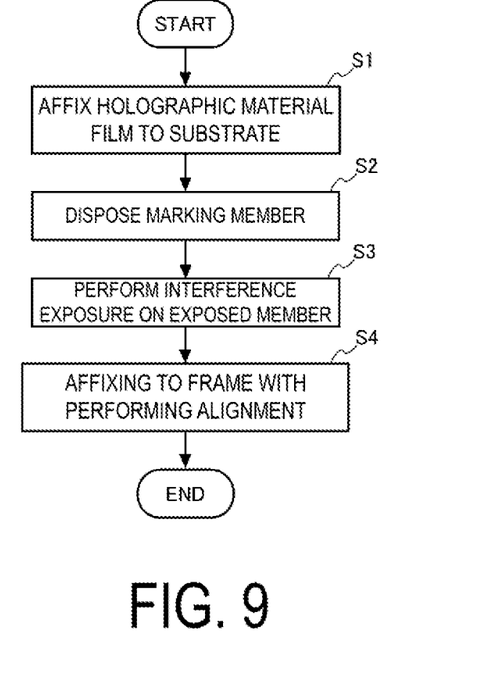
FIG. 9 is a flowchart illustrating a manufacturing process.

FIG. 9 is a flowchart illustrating a manufacturing process of the deflection optical element 13.

First, the holographic material film 217 is affixed to the substrate 211 (Step S1), to produce the exposed member 219. The holographic material film 217 is a film including the holographic material layer 213 and the transparent film layer 215, and is in a state where no interference fringes are formed in the holographic material layer 213. The surface on the side on which the holographic material layer 213 of the holographic material film 217 is provided is affixed to the substrate 211.

Next, the marking members 240a and 240b are disposed in the optical path of the object light OB emitted from the exposure device 300 and at positions corresponding to the positions at which the alignment marks 230a and 230b of the holographic material film 217 are to be formed (Step S2). At this time, it is advisable to ensure in advance that light passing through the marking members 240a and 240b does not adversely affect the optically effective area 220.

Next, the exposed member 219 is subjected to an interference exposure by the exposure device 300 (Step S3), to form interference fringes in the holographic material film 217. The reference light SB and the object light OB are irradiated by the exposure device 300 to the holographic material film 217 to generate interference fringes in the holographic material film 217. At this time, properly selecting the wavelengths of the object light OB and the reference light SB allows interference fringes having a desired pitch and a desired tilt angle to be formed in the holographic material film 217. Further, the holographic material film 217 where the interference fringes are formed may be subjected to a treatment such as ultraviolet irradiation, visible light irradiation, heat treatment, or the like. This allows the interference fringes formed in the holographic material film 217 to be fixed, thus decolorizing the holographic material layer 213. This results in a formation of the deflection optical element 13 including the holographic material layer 213 where interference fringes are formed.

Further, the interference exposure performed by the exposure device 300 leads to a formation of the alignment marks 230a and 230b in the holographic material layer 213. The alignment marks 230a and 230b are formed within the optically effective area 220 that causes the image light Lb incident on the holographic material layer 213 to be diffracted, and interference fringes are formed, which are discontinuous in phase with the interference fringes formed in other regions of the optically effective area 220.

Next, the deflection optical element 13 is affixed to the frame 15 where the alignment marks 350a and 350b are formed, with the deflection optical element 13 being aligned with the alignment marks 350a and 350b (Step S4). At this time, an alignment is performed such that the positions of the alignment marks 350a and 350b formed in the frame 15 coincide with the positions of the alignment marks 230a and 230b formed in the deflection optical element 13, to thus affix the deflection optical element 13 to the frame 15.

As described above, the display device 1 according to the first embodiment includes the image-light generating unit 10a and the image-light generating unit 10b, and the light-guiding optical systems 17a and 17b configured to guide the image light L emitted from the image-light generating unit 10a and the image-light generating unit 10b. The light-guiding optical systems 17a and 17b include the deflection optical elements 13a and 13b, respectively.

The deflection optical element 13 is an optical element including the substrate 211 having translucency, and the holographic material layer 213 disposed on the substrate 211 in an overlapping manner, where in the holographic material layer 213, a diffraction grating composed of interference fringes is formed. The deflection optical element 13 diffracts incident light.

The alignment marks 230a and 230b equivalent of a marking area where interference fringes are discontinuous are formed in the holographic material layer 213. The alignment marks 230a and 230b are located within the optically effective area 220 that causes the holographic material layer 213 to diffract incident light.

Accordingly, because the alignment marks 230a and 230b where the interference fringes are discontinuous are formed within the optically effective area 220, the alignment performed when the deflection optical element 13 is affixed to the frame 15 or the like can be done with high accuracy, for example. Further, because it is unnecessary to form interference fringes outside of the optically effective area 220, a preparation of a holographic material larger than the optically effective area used for diffraction of light becomes unnecessary, making it possible to suppress increase in size of the exposure device that exposes the holographic material.

Further, in the alignment marks 230a and 230b, interference fringes discontinuous with the interference fringes formed in the areas other than the alignment marks 230a and 230b are formed.

Accordingly, within the optically effective area 220, the alignment performed when attaching the deflection optical element 13 to a member such as the frame 15 with accentuating the alignment marks 230a and 230b can be more facilitated.

In addition, the transparent film layer 215 that is a surface layer having translucency is provided, and the holographic material layer 213 is disposed between the substrate 211 and the transparent film layer 215.

This allows the transparent film layer 215 to protect the holographic material layer 213, and allows light to be incident on the holographic material layer 213, causing the holographic material layer 213 to diffract the incident light.

Further, in the holographic material layer 213, a plurality of the alignment marks 230a and 230b are formed in the optically effective area 220.

This allows the alignment performed when affixing the deflection optical element 13 to a member such as the frame 15 to be more facilitated.

Further, the method for manufacturing an optical element is a manufacturing method in which coherent light is separated into the object light OB and the reference light SB to irradiate the object light OB and the reference light SB to the exposed member 219 including the holographic material film 217. A diffraction grating composed of interference fringes is formed in the holographic material film 217 irradiated with the object light OB and the reference light SB.

In the manufacturing method, the marking members 240a and 240b that makes interference fringes discontinuous is disposed in the optical path of the object light OB irradiated to the exposed member 219. Then, the alignment marks 230a and 230b where interference fringes are discontinuous are formed in the exposed member.

This allows the alignment marks 230a and 230b where interference fringes are discontinuous to be formed within the optically effective area 220 where the interference fringes are formed.

Second Embodiment

Figure 10:
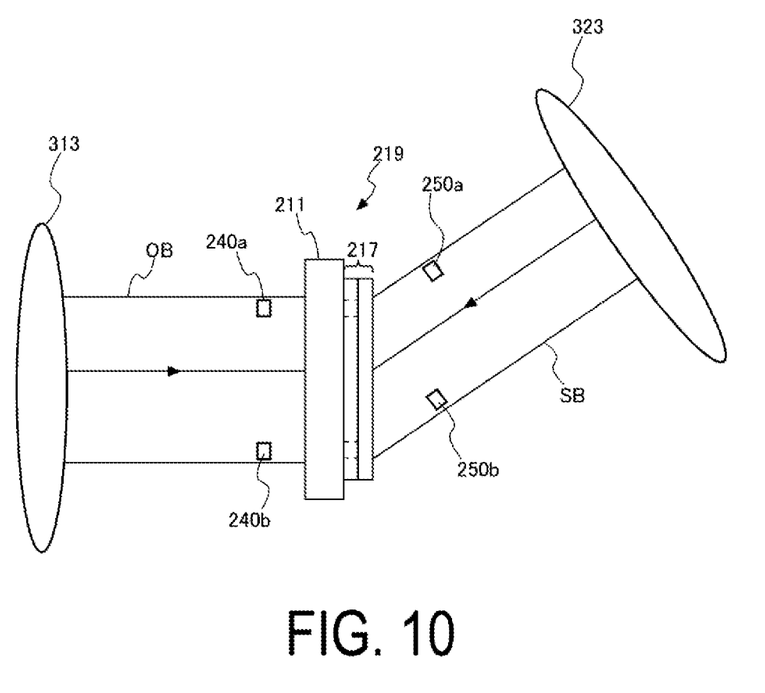
FIG. 10 is an enlarged view of a main portion of an exposure device and a holographic material layer.

The second embodiment of the present disclosure will now be described below with reference to FIG. 10. FIG. 10 is a partially enlarged view of the exposure device 300 and the holographic material layer 213.

In the second embodiment, a half-wavelength plate, a quarter-wavelength plate, a liquid crystal, or the like is disposed, as the marking members 240a and 240b, in the optical path of the object light OB and at positions corresponding to the positions at which the alignment marks 230a and 230b are to be formed. Further, as illustrated in FIG. 10, marking members 250a and 250b such as a half-wavelength plate, a quarter-wavelength plate, a liquid crystal, or the like are also disposed in the optical path of the reference light SB and at positions corresponding to the positions at which the alignment marks 230a and 230b are to be formed.

This makes it possible to align the polarization of the object light OB and the reference light SB irradiated to the positions at which the alignment marks 230a and 230b are to be formed, and to form the alignment marks 230a and 230b at the positions at which the alignment marks 230a and 230b are to be formed. Further, using a half-wavelength plate, a quarter-wavelength plate, a liquid crystal, or the like for the marking members 240a and 240b and the marking members 250a and 250b can adjust the amount of displacement in phase between the interference fringes formed in the marking members 240a and 240b and the interference fringes formed in other regions.

In addition, a light-shielding member that blocks the object light OB may be used as the marking members 240a and 240b. Using the light-shielding member for the marking members 240a and 240b does not cause interference fringes to be formed in the alignment marks 230a and 230b. The alignment marks 230a and 230b, where no interference fringes are formed, can be easily distinguished from other regions of the optically effective area 220, and can be used as a mark when performing an alignment process.

The above-described embodiments are preferred embodiments of the present disclosure. However, in the present disclosure, various modifications are possible within the scope that does not depart from the gist of the present disclosure without being limited to the above-described embodiments.

For example, while the above-described embodiments have been described by way of examples in which a reflection-type hologram is produced, the present disclosure can also be applied to cases where a transmission-type hologram is produced.

Further, the reference light SB and the object light OB may be planar waves or spherical waves. In addition, one of the reference light SB or the object light OB may be planar waves, and the other may be spherical waves.

Further, although FIG. 2 illustrates an example in which the holographic material layer 213 and the transparent film layer 215 of the deflection optical element 13b are disposed on the side of the left eye Eb, the deflection optical element 13b may be disposed to cause the substrate 211 to be disposed on the side of the left eye Eb. That is, the substrate 211, the holographic material layer 213, and the transparent film layer 215 may be arranged in this order from the side of the left eye Eb.

Further, as the light source provided in the image-light generating unit 10a and the image-light generating unit 10b, an organic electroluminescence element (OLED: Organic Light Emitting Diode), and a self-luminous element such as a micro LED array, quantum-dot light emitting element (QLED: quantum-dot light emitting diode) may be used. In addition, the image-light generating units 10a and 10b may be configured by a light-emitting diode and a liquid crystal panel that modulates light emitted from the light-emitting diode.

What is claimed is:

1. An optical element diffracting incident light, the optical element comprising:
   a substrate having translucency; and
   a holographic material layer disposed so as to overlap the substrate, the holographic material layer including a non-marking area that has interference fringes and a marking area that has interference fringes and that is surrounded by the non-marking area, wherein
   the interference fringes of the marking area are discontinuous to the interference fringes of the non-marking area, and
   the marking area and the non-marking area are located in an area where the holographic material layer diffracts the incident light.

2. The optical element according to claim 1, comprising a surface layer having translucency, wherein
   the holographic material layer is disposed between the substrate and the surface layer.

3. The optical element according to claim 1, wherein the holographic material layer is provided with a plurality of the marking areas.

4. A display device comprising:
   an image-light generating unit configured to generate image light; and
   a light-guiding optical system configured to guide the image light emitted from the image-light generating unit, wherein
   the light-guiding optical system includes the optical element according to claim 1.

5. A method for manufacturing an optical element, by exposing an exposed member to form a diffraction grating composed of interference fringes,
   the method comprising:
   disposing a marking member, that makes the interference fringes discontinuous, in at least one of an optical path of a reference light with which the exposed member is irradiated and an optical path of an object light with which the exposed member is irradiated; and
   forming, in the exposed member, a non-marking area that has the interference fringes and a marking area that has the interference fringes and that is surrounded by the non-marking area, wherein the interference fringes of the marking area are discontinuous to the interference fringes of the non-marking area.

* * * * *